UNITED STATES PATENT OFFICE.

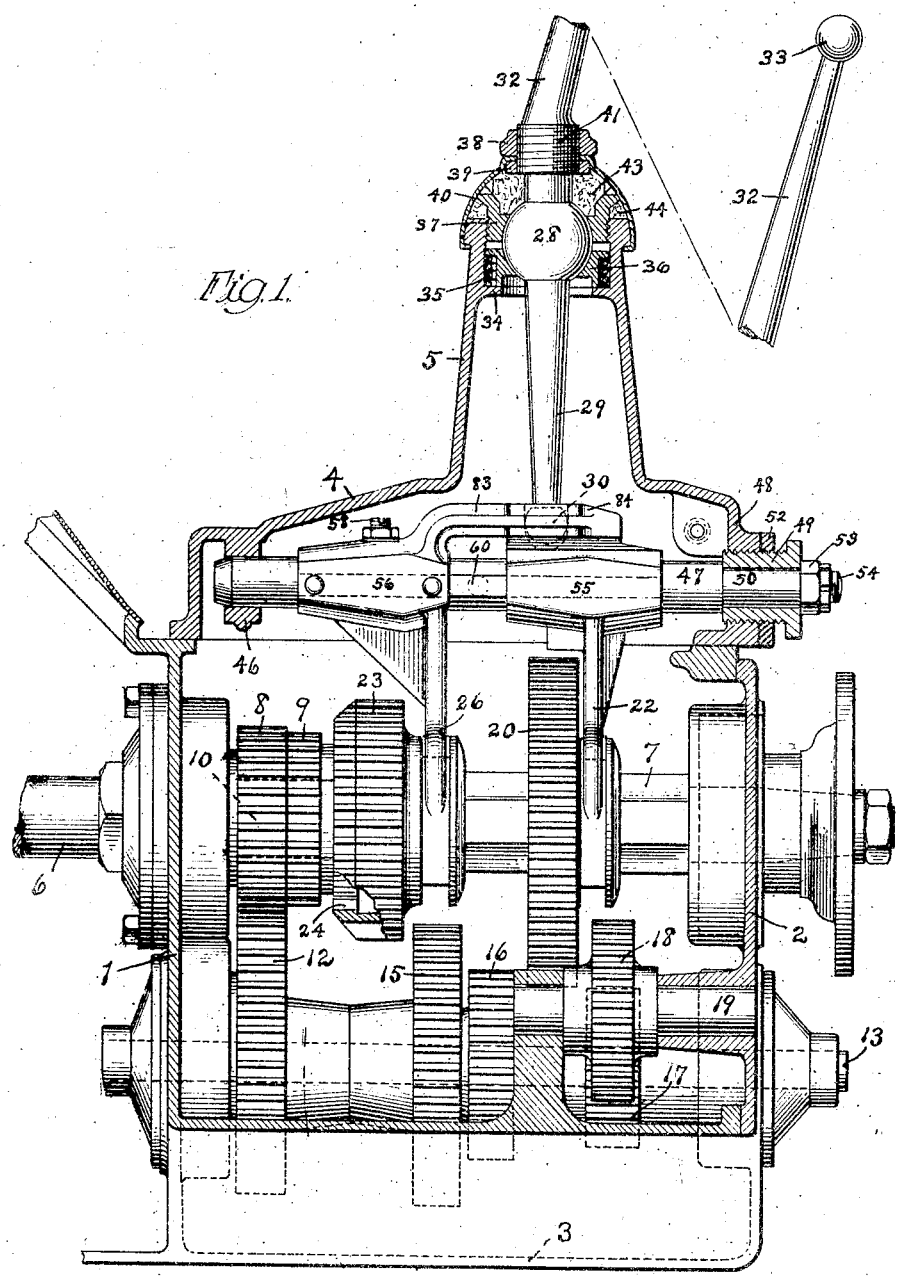

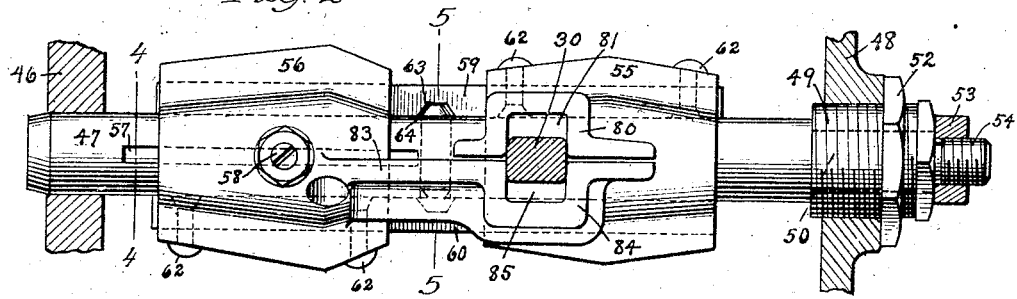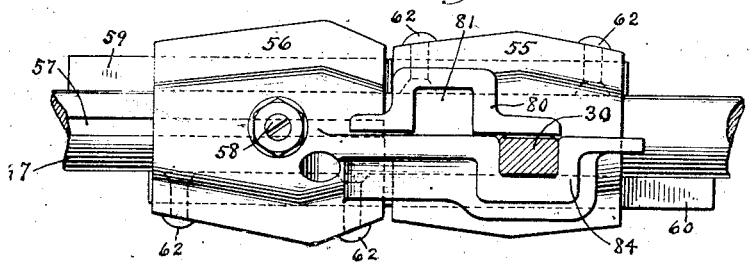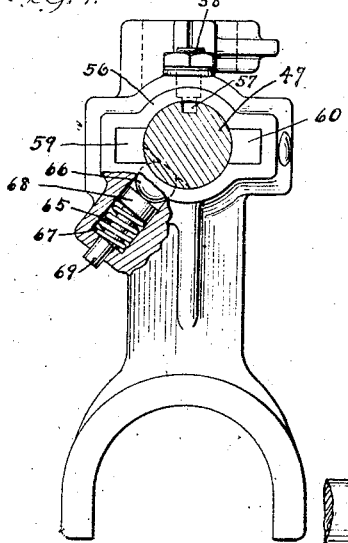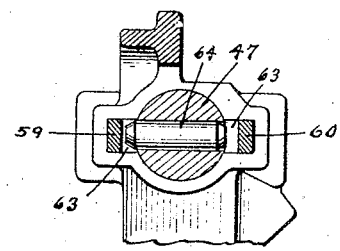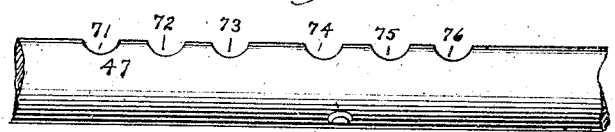

FRANK JOHNSON, OF DETROIT, MICHIGAN.

GEAR-SHIFTING MECHANISM.

1,156,405.

Specification of Letters Patent.

Patented Oct. 12, 1915.

Application filed June 28, 1915. Serial No. 36,634. REISSUED

*To all whom it may concern:*

Be it known that I, FRANK JOHNSON, a citizen of the United States, residing at Detroit, in the county of Wayne and State of Michigan, have invented a new and useful Gear-Shifting Mechanism, of which the following is a specification.

This invention relates to means for shifting the movable gears of "change speed mechanisms" within the ordinary gear boxes of motor vehicles, and its object is to provide a shifting mechanism that can be completely assembled before being mounted on the gear box, which will adjust itself to the gears to be shifted, which will interlock the gears and permit the movement of but one of them until said gear has been returned to neutral position, and which shall have all necessary strength.

This invention consists, in combination of a gear box, the gears therein, two of them being shiftable, a cover for the gear box, and an operating lever mounted intermediate its ends on the cover, of a revolubly and longitudinally adjustable shaft, gear shifting forks slidable on the shaft, means whereby one fork is held from turning on the shaft by the other, means for positioning the forks longitudinally of the shaft, and means for preventing either fork being moved from neutral position until the other fork has been moved back to neutral position.

In the accompanying drawings, Figure 1 is a vertical longitudinal section of a change speed gearing provided with this improved shifting mechanism, the gears and shafts being in elevation. Fig. 2 is a plan of the shifting mechanism. Fig. 3 is another plan of the same with the parts in slightly different position. Fig. 4 is an end view on the line 4—4 of Fig. 2. Fig. 5 is a section on the line 5—5 of Fig. 2. Fig. 6 is a view of the supporting shaft.

Similar reference characters refer to like parts throughout the several views.

The gears shown in Fig. 1 are of well known construction and are mounted in a box having ends 1 and 2, bottom 3, and cover 4 provided with a pedestal 5. The main shaft 6 from the engine is in alinement with the fluted shaft 7 on which the slidable gears are movable. On the shaft 6 is a double gear 8—9, in which the reduced end 10 of the shaft 7 is journaled.

The constantly running gear 8 meshes with the gear 12 on the countershaft 13, which has the gears 15, 16 and 17 secured to it. The gear 17 meshes with the reversing pinion 18 on the shaft 19. The gear 20 can be slid on the shaft 7, by means of the fork 22 extending down from the cover, into mesh with the gear 16 or with the pinion 18, so that the shaft 7 may be driven at the lowest forward speed or at a reverse speed as may be desired. The other gear 23 and the internally toothed clutch member 24 are also slidable on the shaft 7 and the clutch member is adapted to slip over the constantly running gear 9 to drive the shaft 7 at the speed of the shaft 6. This member can also be moved so that the gear 23 will engage the gear 15 on the counter shaft, so that the shaft 7 will be driven at next to the highest speed. This movement is brought about by the fork 26 extending down from the cover, and to prevent the movement of the forks to shift either the gear 20 or the gear 23—24 except when the other is at neutral position, that is, out of engagement with either of the gears with which it may engage, is the problem the present invention is designed to meet. It will be understood that the parts thus far described are well known.

The operating lever of this device comprises a ball 28 from which an arm 29 ending in a head 30 extends down, and a handle 32 having a ball 33 at its upper end extends up. The pedestal has an inwardly extending flange 34 which supports a spring 35 that presses the bushing 36 against the ball, which is held down by the bushing 37 screwed into the upper end of the pedestal. Two nuts 38 and 39 are mounted on the screw-threaded part 41 of the arm 32, and between them, the hemi-spherical dust cap 40 is mounted. Rings 43 and 44 of felt hold lubricating oil and prevent the entrance of dust, while permitting the arm 29 to be swung in all directions.

The cover 4 is provided with an inner cross wall 46 which is bored to receive one end of the shaft 47. The end 48 of this cover is threaded to receive the bushing 49 in which the reduced portion 50 of this shaft is mounted. A jam-nut 52 positions this bushing and a nut 53 on the reduced end 54 of the shaft prevents endwise movement of the shaft in the bushing while still permitting it to turn. On this shaft are slidable the two heads 55 and 56 to which the forks 22 and 26 are connected. The shaft 47 is provided with a key-way 57 into which extends the reduced end of the screw 58 carried by the head 56, and thus prevents it from turning.

Each head may be provided with a preferably rectangular groove adjacent the bore for the shaft, in which the guide bars 59 and 60 are mounted, the bar 59 being secured to the head 55 and the bar 60 to the head 56 by means of rivets 62 before assembling the shifter. These guide bars permit longitudinal movement of the forks 22 and 26 relative to the shaft 7, but prevent them from swinging transversely relative to each other so that they are always in line.

Each of these guide bars is formed with a notch or socket 63 into which the ends of the control pin 64 may extend, which pin is freely slidable in a transverse hole in the shaft 47. The length of the pin is such that when it extends to the bottom of either socket 63, its opposite end is below or flush with the surface of the shaft. So long as it extends into either socket, the guide bar having said socket cannot be shifted, and the pin cannot move out of this socket until the other guide bar is so positioned that its socket is in line with this pin. By properly positioning these sockets with reference to the forks, so that the sockets will be in alinement with this pin when the gears positioned by the forks are in neutral positions, then it will be impossible to shift either fork until the other fork is brought to neutral position.

Mounted in each head, preferably on the side thereof adjacent the fork, in a proper socket 65, is a ball 66, forced toward the shaft 47 by means of a spring 67 that engages the head 68 of a stem 69 that is guided in a hole in the bottom 70 of the socket. The shaft is preferably formed with six transverse grooves to receive the balls 66 to hold the heads from moving unless slid along the shaft by means of the shifting lever. These grooves are so positioned that when the ball 66, carried by the head 56, is in the groove 71, the internally toothed clutch member 24 will be in engagement with the gear 9 and the shaft 7 will be driven directly or at highest speed. When this ball is in the groove 72, the gear 23 will be in neutral position. When the ball is in the groove 73, the gear 23 will be in engagement with the gear 15 and the shaft 7 will be driven at intermediate speed. When the ball 66, carried by the head 55, is in the groove 74, the gear 20 will be in engagement with the gear 16 and the shaft 7 will be driven at the lowest speed. When the ball is in the groove 75, the gear 20 will be in neutral position. When the ball is in the groove 76, the gear 20 will mesh with the reversing pinion 18 and the shaft 7 is turned at a low speed in a reverse direction. It will be apparent that when the balls of the two heads are in their grooves 72 and 75, that the pin 64 can move into either socket 63.

Mounted on the head 55 is a vertical flange 80 forming a pocket 81 into which the lower end 30 of the shifting lever may engage, and extending from the head 56 is an arm 83 provided with a flange 84 which also forms a pocket 85 to receive the shifting lever. When the heads and forks are at neutral, as shown in Fig. 2, these pockets are in alinement and the end 30 of the shifting lever may be swung laterally into either pocket and either head and fork may be shifted longitudinally of the shaft 47. But when either head has been moved sufficiently to move its ball 66 out of a neutral groove, the flanges 80 or 84 of the other head will prevent the end 30 of the shifting lever from leaving the pocket. By this means, only one of the heads can be shifted at a time.

Many changes in the details of the construction of this device may be made without departing from the spirit of my invention as set forth in the claims, so long as the two great advantages are retained, which are, that this entire shifting device can be assembled before being mounted in the gear box, and that the mechanism adjusts itself to considerable variations in the construction.

I claim:—

1. In a change-speed gearing, the combination of a gear box, a shaft and gears mounted therein, two of said gears being slidable on the shaft, a second shaft revolubly mounted substantially parallel to the first, two heads slidable on said second shaft, forks extending from said heads into engagement with the slidable gears, an interlock to prevent both of the heads being moved from neutral position, and means to shift the heads, forks and gears.

2. In a change-speed gearing, the combination of a gear box, a shaft and gears mounted therein, two of said gears being slidable on the shaft, a second shaft revolubly mounted substantially parallel to the first, means for longitudinally adjusting said shaft, two heads slidable on said second shaft, forks extending from said heads into engagement with the slidable gears, an interlock to prevent both of the heads being moved simultaneously from neutral position, and means to shift the heads, forks and gears.

3. In a change-speed gearing, the combination of a gear box, a shaft and gears mounted therein, two of said gears being slidable on the shaft, a second shaft revolubly mounted substantially parallel to the first, two heads slidable on said second shaft, forks extending from said heads into engagement with the slidable gears, said shaft having a transverse hole, said heads being each provided with a depression in alinement with said hole when the heads and yokes are in neutral positions, a pin slidable in said hole of such greater length than the diameter of the shaft that it extends into at least one of said depressions and always prevents the movement of one of the heads, and means to shift the heads, forks and gears.

4. In a change-speed gearing, the combination of a gear box having a cover, a pedestal mounted on the cover, a shaft and gears mounted in said gear box, two of said gears being slidable on the shaft, a second shaft revolubly mounted substantially parallel to the first shaft, two heads slidable on said second shaft, forks extending from said heads into engagement with the slidable gears, an interlock to prevent both of the heads from being moved at the same time and a shifting lever mounted intermediate its ends at the top of the pedestal and extending into engagement with said heads to shift the heads, forks and gears.

5. In a change-speed gearing, the combination of a gear box, a shaft and gears mounted therein, two of said gears being slidable on the shaft, a second shaft revolubly mounted substantially parallel to the first, two heads independently slidable on said second shaft, said second shaft having a longitudinal key-way, means mounted on one of the heads and extending into said key-way to prevent said head from turning on the shaft, means to prevent relative rotation between said heads, forks extending from said head into engagement with the slidable gears, an interlock to prevent both of the heads being moved simultaneously, and means to shift the heads, forks and gears.

6. In a change-speed gearing, the combination of a gear box, a shaft and gears mounted therein, two of said gears being slidable on the shaft, a second shaft revolubly mounted substantially parallel to the first, two heads slidable on said second shaft, forks extending from said heads into engagement with the slidable gears, means to hold each head and the gear slidable thereby in neutral position, an interlock to prevent both heads being simultaneously moved from neutral position, and means to shift the heads, forks and gears.

7. In a change-speed gearing, the combination of a gear box, a shaft and gears mounted therein, two of said gears being slidable on the shaft, the second shaft revoluble substantially parallel to the first, means for longitudinally adjusting said shaft, two heads slidable on said second shaft, means to hold each head at neutral position and at predetermined positions at either side of its neutral position, forks extending from said heads into engagement with the slidable gears, an interlock to prevent both of the heads being moved simultaneously from neutral position, and means to shift the heads, forks and gears.

8. In a change-speed gearing, the combination of a gear box, a series of gears mounted therein, two of said gears being slidable, a shaft revolubly mounted in said gear box, two heads slidable on said shaft, forks extending from said heads into engagement with the slidable gears, an interlocking pin to prevent both of the heads being simultaneously moved from neutral position, and means to shift the heads, forks and gears.

9. In a change-speed gearing, the combination of a gear box, a shaft and gears mounted therein, two of said gears being slidable on said shaft, a second shaft revolubly mounted in said gear box, two heads slidable on said second shaft, forks extending from said heads into engagement with the slidable gears, a longitudinal guide groove formed in one head, a guide bar mounted in the other head and extending into said groove to prevent relative rotation between said heads, an interlock to prevent both of the heads being simultaneously moved from neutral position, and means to shift the heads, forks and gears.

10. In a change speed gearing, the combination of a gear box, a shaft and gears mounted therein, two of said gears being slidable on the shaft, a second shaft revolubly mounted in said gear box and provided with a longitudinal guide groove, two heads slidable on said second shaft, one of said heads having a projection extending into said guide groove to prevent relative rotation between said head and shaft, means to prevent relative rotation between said heads, forks extending from said heads into engagement with the slidable gears, an interlock to prevent both of the heads being moved simultaneously from neutral position, and means to shift the heads, forks and gears.

11. In a change-speed gearing, the combination of a gear box, a shaft and gears mounted therein, two of said gears being slidable on the shaft, a second shaft revolubly mounted adjacent the first, two heads slidable on said second shaft, a longitudinal guide groove formed in each head adjacent the bore for the shaft, a guide bar mounted in each head and extending into the groove in the other head to prevent relative rotation between the heads, forks extending from said heads into engagement with the slidable gears, an interlocking pin mounted in said shaft and adapted to slide transversely thereof into depressions in said guide bars when the forks and gears are in neutral position, said pin being of such length as to prevent simultaneous movement of said heads from neutral position, and means to shift the heads, forks and gears.

12. In a change-speed gearing, the combination of a gear box, a shaft and gears mounted therein, two of said gears being slidable on the shaft, a second shaft revolubly mounted adjacent the first, two heads slidable on said second shaft and having longitudinal flanges provided with pockets in their adjacent faces, forks extending from said heads into engagement with the slidable gears, an interlock to prevent both of the heads being moved simultaneously from a position where said pockets register with each other, and a shifting lever extending into said pockets and movable transversely from one pocket into the other and longitudinally of said shaft with either of said heads to shift the heads, forks and gears.

13. In a change speed gearing, the combination of a gear box, two engaging members slidable therein, a shaft revolubly mounted adjacent said engaging members, two heads movable longitudinally of said shaft, means to prevent the movement of both heads at the same time, means to slide said heads on the shaft, and means to connect said engaging members and said heads into pairs.

In testimony whereof I have signed this specification.

FRANK JOHNSON.